United States Patent
Diezmann et al.

(10) Patent No.: US 10,777,090 B2
(45) Date of Patent: Sep. 15, 2020

(54) PERSONALIZED TRAINING MATERIALS USING A HEURISTIC APPROACH

(71) Applicant: Phonize, Inc., Palo Alto, CA (US)

(72) Inventors: Rudiger Diezmann, San Jose, CA (US); Roy Hanif, Redwood City, CA (US)

(73) Assignee: Phonize, Inc., Palo Alto, CA (US)

( * ) Notice: Subject to any disclaimer, the term of this patent is extended or adjusted under 35 U.S.C. 154(b) by 207 days.

(21) Appl. No.: 15/095,126

(22) Filed: Apr. 10, 2016

(65) Prior Publication Data

US 2016/0300503 A1    Oct. 13, 2016

Related U.S. Application Data

(60) Provisional application No. 62/146,077, filed on Apr. 10, 2015.

(51) Int. Cl.
| | |
|---|---|
| *G09B 7/08* | (2006.01) |
| *G09B 7/00* | (2006.01) |
| *G09B 7/02* | (2006.01) |
| *G09B 7/04* | (2006.01) |

(52) U.S. Cl.
CPC ............... *G09B 7/08* (2013.01); *G09B 7/00* (2013.01); *G09B 7/02* (2013.01); *G09B 7/04* (2013.01)

(58) Field of Classification Search
CPC .............. G09B 7/07; G09B 7/08; G09B 7/12
See application file for complete search history.

(56) References Cited

U.S. PATENT DOCUMENTS

| | | | |
|---|---|---|---|
| 6,064,856 A | 5/2000 | Lee | |
| 6,159,014 A | 12/2000 | Jenkins et al. | |
| 6,471,521 B1 | 10/2002 | Dornbush et al. | |
| 6,626,679 B2 | 9/2003 | Skeans et al. | |
| 6,726,486 B2 | 4/2004 | Budra et al. | |
| 6,871,195 B2 | 3/2005 | Ryan et al. | |
| 6,978,115 B2 | 12/2005 | Whitehurst et al. | |
| 6,996,366 B2 | 2/2006 | L'Allier et al. | |
| 7,050,753 B2 | 5/2006 | Knutson | |

(Continued)

FOREIGN PATENT DOCUMENTS

WO        2001082264 A1    11/2001

OTHER PUBLICATIONS

Ribeiro, et al. Evaluation system for e-learning with pattern mining tools, Systems, Man and Cybernetics, 2008. SMC 2008. IEEE International Conference, pp. 3051,3056, 2008, DOI: 10.1109/ICSMC.2008.4811763.

*Primary Examiner* — James S. McClellan
(74) *Attorney, Agent, or Firm* — Invoke

(57) ABSTRACT

Using various embodiments, methods and systems for implementing a learning management system to heuristically analyze behavior of a user and customizing personalized training materials have been disclosed. In one embodiment, the user is presented with educational courses structured into at least one knowledge domain or topic. The user selects a course and is provided with lessons associated with the knowledge domain. The user is then given an opportunity to test their knowledge by presenting them with a quiz. Once it is determined that the user does not have a through understanding of the subject matter being tested, supplemental/detailed training material that is heuristically customized for the user is displayed.

20 Claims, 12 Drawing Sheets

(56) References Cited

U.S. PATENT DOCUMENTS

| | | |
|---|---|---|
| 7,985,074 B2 | 7/2011 | Bell et al. |
| 8,175,511 B1 | 5/2012 | Sordo et al. |
| 8,597,030 B2 | 12/2013 | Aaron |
| 8,602,793 B1 | 12/2013 | Sniedzins |
| 8,666,298 B2 | 3/2014 | Liang et al. |
| 2002/0160348 A1 | 10/2002 | Lin et al. |
| 2003/0233242 A1* | 12/2003 | Wenger .................. G06Q 10/10 705/328 |
| 2004/0076941 A1 | 4/2004 | Cunningham et al. |
| 2004/0180317 A1 | 9/2004 | Bodner et al. |
| 2006/0154226 A1* | 7/2006 | Maxfield .................. G09B 7/00 434/323 |
| 2009/0325140 A1 | 12/2009 | Gray et al. |
| 2014/0295384 A1 | 10/2014 | Nielson et al. |

* cited by examiner

Figure 3    300

Select a Topic (Knowledge Domain) related to Educational Course 1 401

Topic 1 214

Topic 2 214

Topic 3 214

Topic 4 214

Topic 1 Training Material 502

Topic 1 Training Material 504

<Category Content 1> Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

<Category Content 2> Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

Take Quiz 506

Figure 5  500

Content 1 Detailed level 2 222

704
Heuristically determined detailed Topic Training Material associated with category 116
Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Excepteur sint occaecat cupidatat non proident, sunt in culpa qui officia deserunt mollit anim id est laborum.

Take Quiz Again 706

```
┌─────────────────────────────────────────┐
│ Present user with educational course(s) │
│ tailored to specific knowledge domains  │
│ from which user can select at least one │
│ knowledge domain                        │
│ 902                                     │
└─────────────────────────────────────────┘
                   │
                   ▼
┌─────────────────────────────────────────┐
│ Based on user selection, display at     │
│ least one lesson, each lesson comprising│
│ subject matter related to one or more   │
│ categories associated with the at least │
│ one knowledge domain 904                │
└─────────────────────────────────────────┘
                   │
                   ▼
┌─────────────────────────────────────────┐
│ Responsive to user's instruction to     │
│ display quiz, provide at least one      │
│ question related to the one or more     │
│ categories. 906                         │
└─────────────────────────────────────────┘
```

- User's answer determined as incorrect for the question 908
- Determine time taken by user to submit response to the question 910
- Determine other metrics 912

Determine Threshold value for Category associated with question 914

Once threshold is reached/advanced, heuristically determine level of detailed lessons to display to the user 916

Display determined detailed/supplemental lessons to the user 918

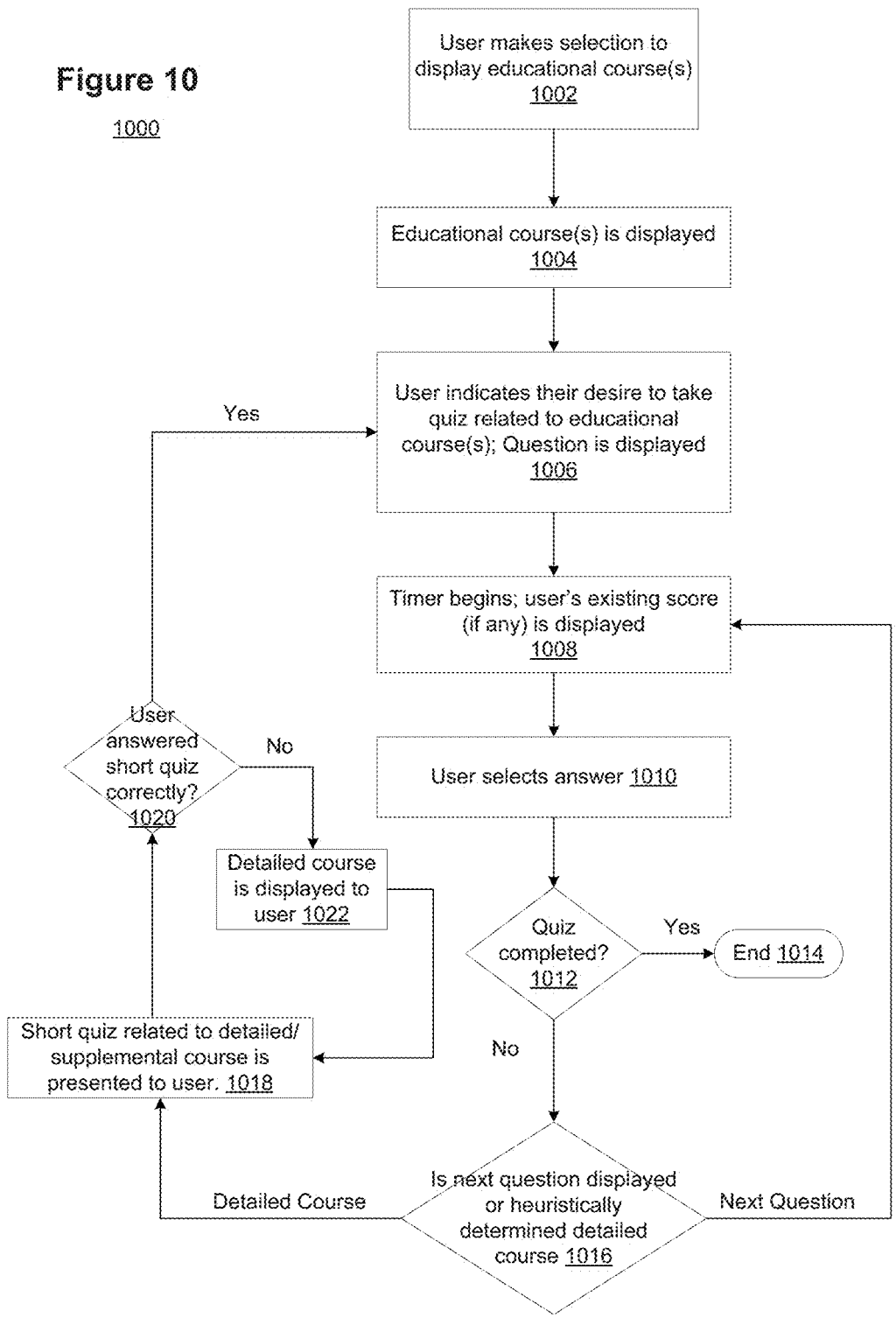

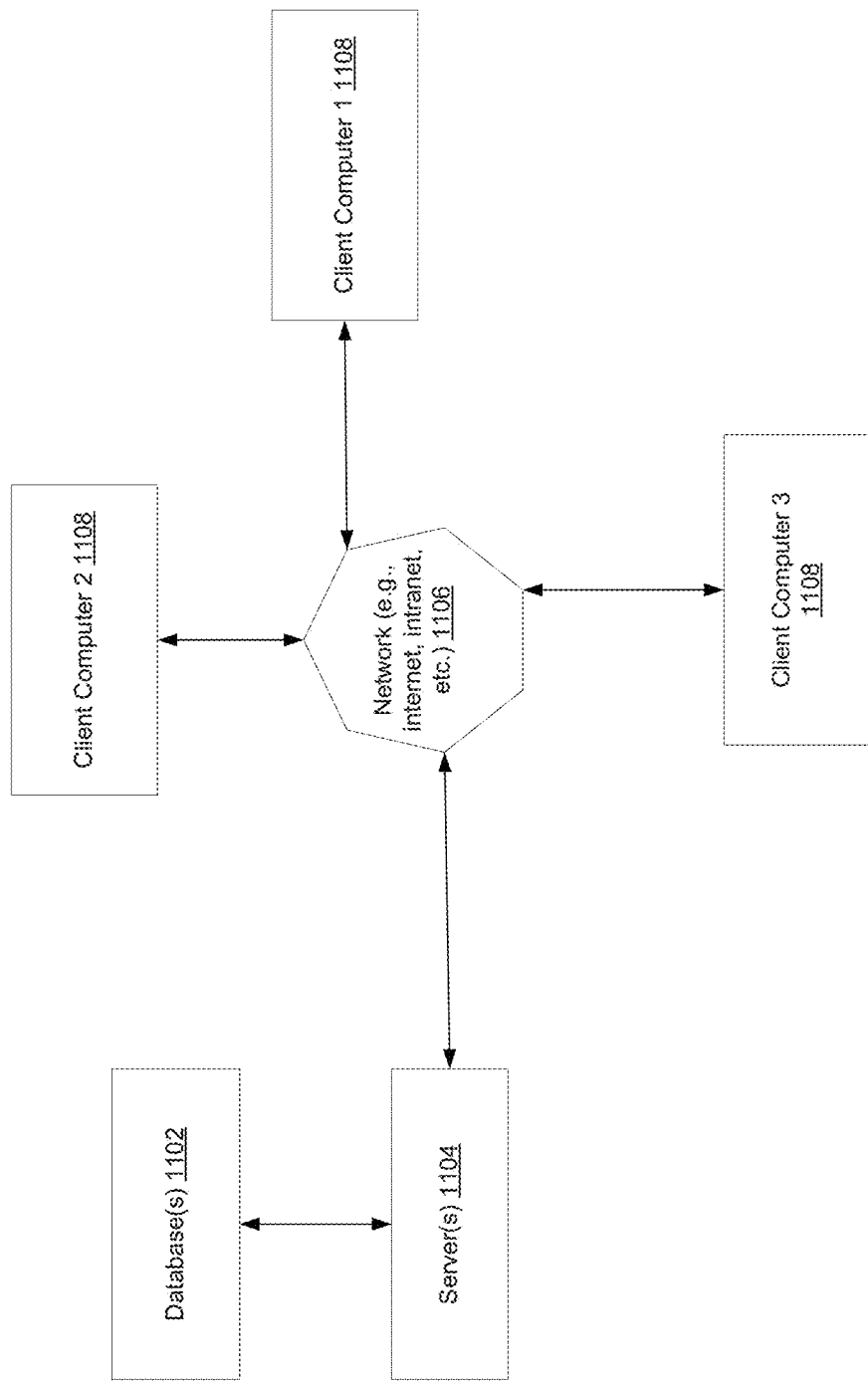

PERSONALIZED TRAINING MATERIALS USING A HEURISTIC APPROACH

CROSS REFERENCE TO RELATED APPLICATIONS

The present application claims priority from U.S. Provisional Patent Application No. 62/146,077, filed on Apr. 10, 2015, under 35 U.S.C. 119(e), the contents thereof are incorporated herein by reference, for all purposes to the extent that such subject matter is not inconsistent herewith.

FIELD OF THE INVENTION

Embodiments of the present invention relates generally to the field of learning management systems. More particularly, embodiments of the invention relate to generating customized training materials for a student using a heuristic approach.

BACKGROUND OF THE INVENTION

A learning management system (LMS) is a software application for the administration, documentation, tracking, reporting and delivery of electronic educational technology (also called e-learning) education courses or training programs. LMSs' range from systems for managing training and educational records to software for distributing online or blended/hybrid college courses over the Internet with features for online collaboration. Colleges and universities use LMSs' to deliver online courses and augment on-campus courses. Corporate training departments use LMSs' to deliver online training, as well as to automate record-keeping and employee registration.

However, current LMSs' operate using a fixed structure and provide static content to the individual, that is, the content of each LMS is the same regardless of the student's capacity to understand the material. Thus, what is needed is an LMS that provides customized training materials based on an analysis of the student's understanding of course.

SUMMARY

The invention generally relates analyzing student behavior and generating customized individual training materials in an LMS. The embodiments disclosed implement a learning management system to heuristically analyze behavior of a user and customizing individualized training materials have been disclosed. In one embodiment, the user is presented at least one educational course structured into at least one knowledge domain. Upon receiving a selection from the user, the system displays at least one lesson associated with at least one knowledge domain. A lesson includes subject matter related to at least one category associated with the at least one knowledge domain. The user can then elect to take a quiz having at least one question related to at least one category. As the user answers the question, metrics related to user's behavior, including time taken to respond to the question, the answer chosen, or other metrics, etc. are calculated and a value related to the user's understanding of the subject matter is determined and tracked. The tracked value can then be compared to a determined threshold value associated with at least one category. Once it has been determined that the tracked value has reached or passed (e.g., exceeded) the threshold value, the quiz is terminated (or temporarily terminated), and the system can heuristically determine a level of detailed or supplemental lessons that need to be displayed to the user. A higher level signifies a more detailed training material is displayed to the user. In another embodiment, a short quiz is presented to the user upon successfully studying, or while studying the detailed/supplemental training material. Once the user answers the short quiz correctly, the user is given an opportunity to continue with the quiz from where it was terminated.

These and other features, aspects, and advantages of the disclosure are described in more detail below in the detailed description and in conjunction with the following figures.

BRIEF DESCRIPTION OF THE DRAWINGS

The present invention is illustrated by way of example and not limitation in the figures of the accompanying drawings in which like references indicate similar elements.

FIG. 4 illustrates a diagram describing knowledge domains associated with an educational course according to an embodiment of the present invention.

FIG. 5 illustrates a diagram of an educational course material associated with one or more categories of subject matter according to an embodiment of the present invention.

FIG. 7 illustrates a diagram of a heuristically determined detailed training material associated with at least one category related to a quiz question, according to an embodiment of the present invention.

FIG. 9 illustrates a flowchart describing the process flow of a server, according to an embodiment of the present invention.

FIG. 10 illustrates a flowchart describing the process flow of a client machine, according to an embodiment of the present invention.

FIG. 11 describes a block diagram illustrating an exemplary network environment as implemented according to an embodiment of the present invention.

DETAILED DESCRIPTION

Figure 1:
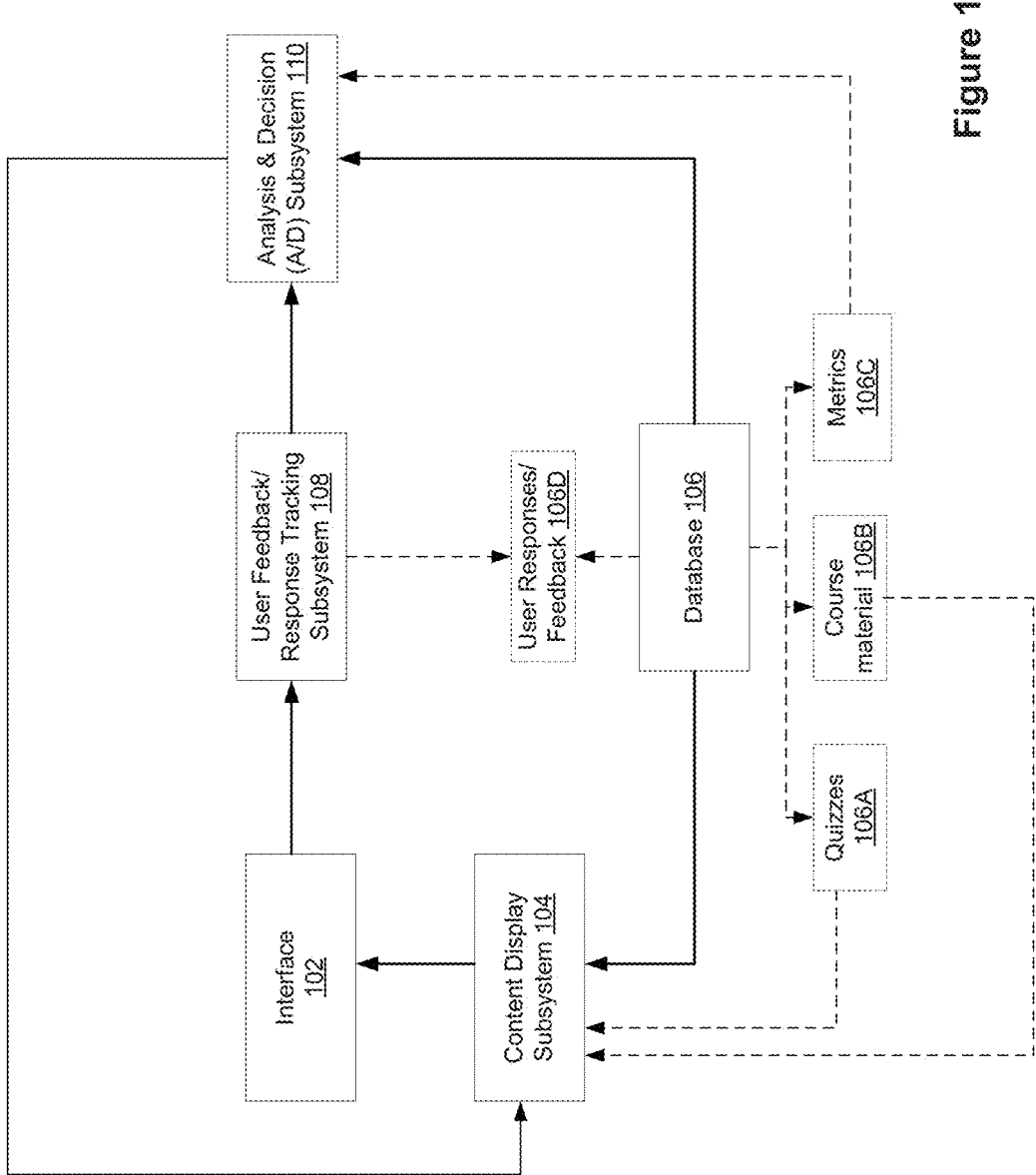
FIG. 1 illustrates a block diagram of a system architecture of an LMS, according to one embodiment of the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Using various embodiments, methods, systems and computer readable medium are disclosed to implement a learning management system that can heuristically analyze behavior of a user and customizing individualized training materials to display at least one educational course structured into at least one knowledge domain. In one embodiment, responsive to a user selection, the system can display at least one course content associated with a knowledge domain, also referred to as course module herein. Each course module/knowledge domain includes at least one lesson related to the knowledge domain. A lesson, as described herein, includes at least one category topic and associated subject matter (content) related to the module/knowledge domain. After the lesson is displayed to the user, responsive to the user's indication to take a quiz, the system can display at least one question related to the category or categories. The system can then determine a metric value related to user behavior or user answer selection, and calculate a tracked value using the metric value, where the tracked value signifies the understanding of the subject matter by user. The system can also determine a threshold value associated with the subject matter category, and if it is determined that the tracked value has reached or surpassed the threshold value, the system can heuristically determine a level of detailed lessons to be displayed to the user. In cases where the tracked value is an increasing value, surpassing the threshold signifies that the tracked value has increased above the threshold value. Similarly, in cases where the tracked value is a decreasing value, surpassing the threshold value signifies that the tracked value has decrease below the threshold value.

In one embodiment, a higher level of detailed lessons signifies a more detailed training material. In another embodiment, the system can also be configured to display a short quiz after displaying the determined level of detailed lessons to the user, to enhance the likelihood of understanding the category/categories of subject matter by the user/student. Thereafter, if the response to the short quiz is correct, the user is presented an opportunity to return back to the main quiz, in one embodiment. The system can also let the user resume the quiz from where it was terminated, in another embodiment.

Although the embodiments described herein related to exemplary embodiments described in the figures, it should be noted that the structures and concepts described herein can be applied to any course that involves substantial material and requires testing a user's skill or understanding of the material.

FIG. 1 illustrates a block diagram of a system architecture of an LMS, according to one embodiment of the present invention. As illustrated system 100, in one embodiment, can have user interface 102, content display subsystem 104, database 106, user feedback/response tracking subsystem 108, and Analysis and Decision (A/D) subsystem 110. Database 106 provides course content, modules, questions, threshold values and/or associated metrics for each question. Content display subsystem 104 retrieves the information from database 106 and displays it to the user via interface 102. Content display subsystem 104 receives course material 106B and an associated quiz(es) 106A from database 106. When the user interacts with system 100, user feedback/response tracking subsystem 108 tracks the user's responses to questions and/or content and provides the data to AD subsystem 110. In one embodiment, user feedback/response tracking subsystem can track any of user mouse click/finger tap, location of click/tap, selected response, time take taken to provide the response/click/tap, etc. Thereafter, A/D subsystem 110 processes the information received by user feedback/response tracking subsystem 108, and along with metrics 106C received from database 106, analyzes the user response and determines the content that should be transmitted to the user by content display subsystem 104. A/D subsystem 110 can, in one embodiment, based on the received metrics 106C and data from user feedback/response tracking subsystem 108, instruct content display subsystem 104 to fetch an appropriate detailed course material 106B and/or quiz 106A from database 106, as further discussed herein.

A/D subsystem 110 is responsible for analyzing user responses and deciding what level of course detail should be presented to the user, based on the user's response and/or feedback to a given course material or quiz. A/D subsystem 110 determines whether additional help related to a course needs to be transmitted to the user. In one embodiment, A/D subsystem 110 determines the appropriate course level and/or quiz based on a tracked value determined based on the data received from user feedback/response tracking subsystem 108. A threshold value is determined based on the metrics received related to each question, quiz, or course material, and if the tracked value increases (or decreases) the threshold value, then A/D subsystem determines options to present to the user to offer further guidance to the user, as described herein. A/D subsystem also determines the level of detail related to a course that needs to be displayed to the user, incase the user requests help from system 100. For example, if user feedback/response tracking subsystem 108, in one embodiment, determines that the user has requested help regarding a certain course material, question, and/or quiz, A/D subsystem 110 can heuristically assess the user's understanding towards the given material and determine the level of detail that needs to be provided to the user (based on the user's tracked value related to the course material, question, and/or quiz). Once the level of detail of course content has been determined, A/D subsystem 110 instructs content display subsystem 104 to display the determined course content, quiz, or question. Content display subsystem 106 retrieves the information from database 106 accordingly.

Figure 2:
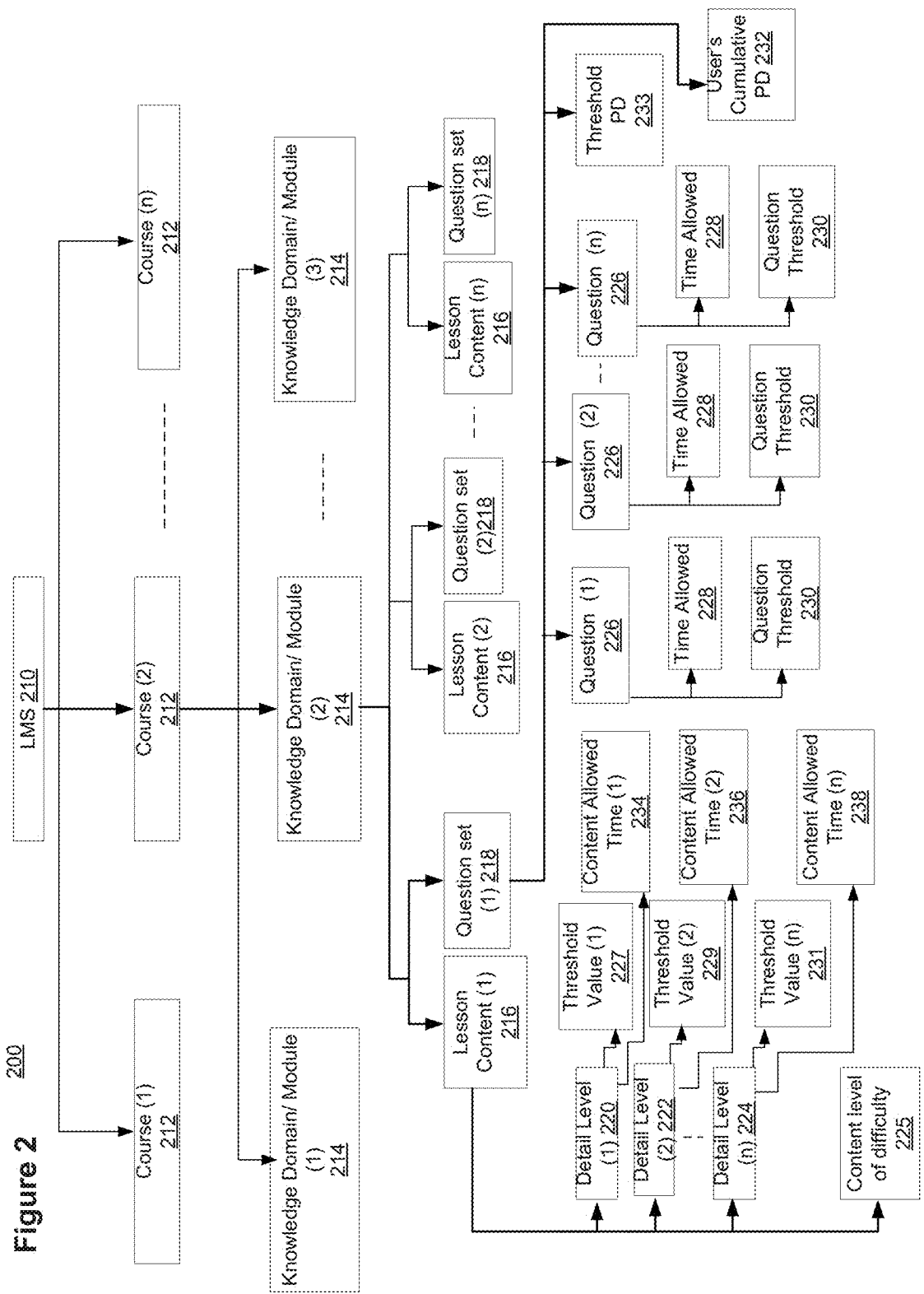
FIG. 2 illustrates a block diagram of a logical layout of a course in the LMS, according to one embodiment of the present invention.

FIG. 2 illustrates a block diagram 200 of a logical layout of a knowledge domain in the LMS, according to one embodiment of the present invention. As illustrated, LMS 201, in one embodiment can comprise at least one course 212. Each course 212 can include at least one module 214 (also referred to as knowledge domain or topic herein). Each module can include at least one lesson content 216 and a related question set (quiz) 218. Each lesson content includes at least one category and associated subject matter detail to test the user's understanding of lesson content 216. Content 216, in one embodiment, can be represented by different detailed lesson levels. In one embodiment, a higher detailed level signifies a more detailed lesson related to the topic. For example, detail level (1) 220 can signify general subject matter of a category, detailed level (2) 222 can signify a detailed version of the subject matter, and detailed level (n) 224 can signify the most elaborated version of the content, where n is a natural number associated with the most detailed level of the course. Each course detail level can be associated with a range of time, as indicated by 234, 236, and 238 for course level (1) 220, detail level (2) 222 and detail level (n) 224, respectively. Time allowed 234, 236, and 238 indicate the range of time that should be taken to comprehend the course content associated with each detail level. Further, each detail level can be associated a threshold value as identified by reference numbers 227, 229, and 231. Threshold values 227, 229, and 231, in one embodiment, indicate the level of comprehension of the associated detailed level of course material, and can be defined as a function of time taken to process the course subject matter divided by the difficulty level 225, as discussed further herein. Therefore, threshold values 227, 229, and 231, in one embodiment are set by the course creator, and are based on the average times it is expected a user to compete the course content. If the user's comprehension value (time taken by the user divided by difficulty level 225) is determined to surpass the threshold value for the detail level, then the system can suggest remedial measures to the user, as discussed further herein. Each associated question set/quiz 218 includes at least one question 226 associated with the content 216. Each question 226 is associated with a metric determined by time allowed (e.g., count down timer) 228 to answer the question, threshold value 230, which, in one embodiment, indicates the time assumed an average student may take to answer the question (set by the course creator), and threshold potential difficulty 233 for the question set, indicating a value which when exceeded, instructs the system in initial remedial measures (e.g., option to study supplemental content (e.g., detail levels (2) through (n)), and the user's cumulative potential difficulty 232 for question set 218, as discussed further herein. In one embodiment, a question can be associated with the main quiz related to a content 216, or a short quiz that is presented to the user after displaying supplemental content.

Figure 3:
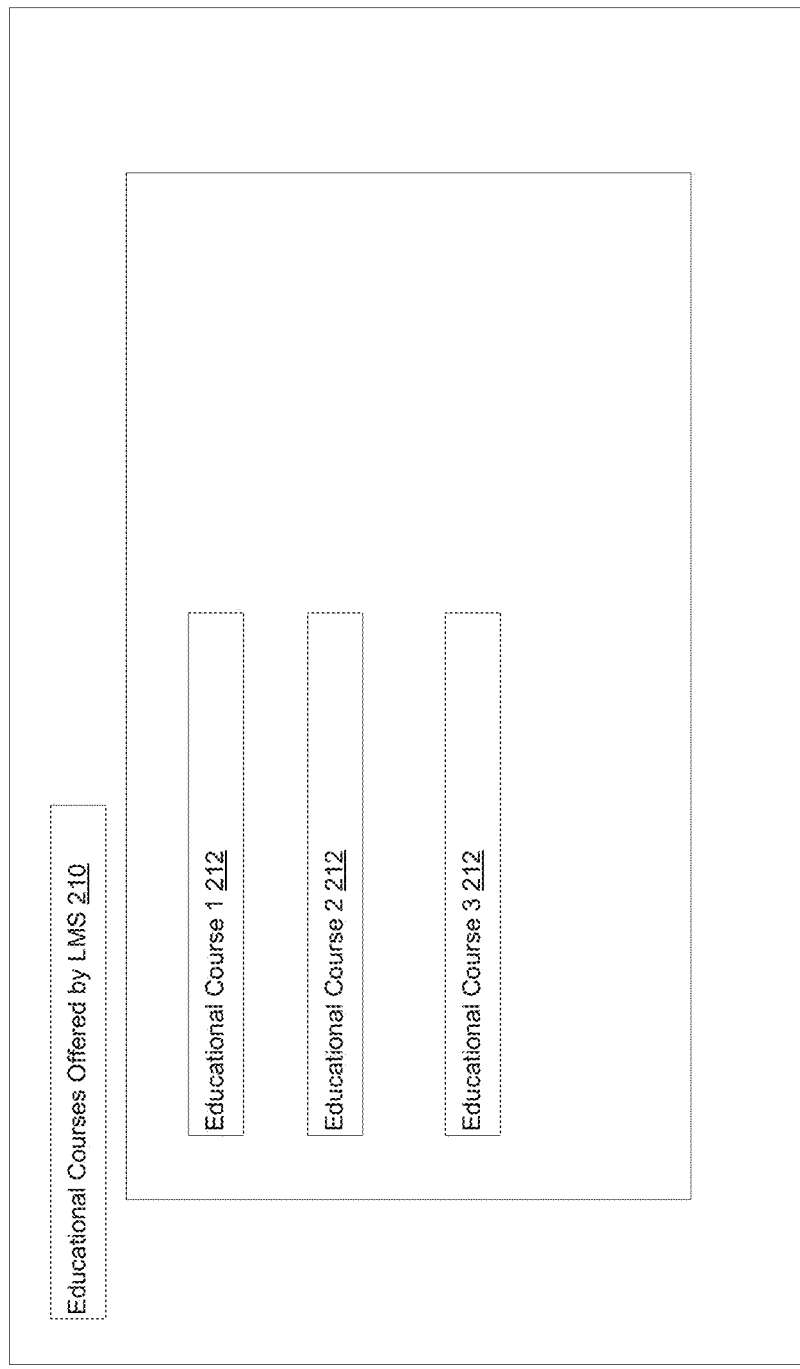
FIG. 3 illustrates a diagram of an e-learning system displaying educational courses according to an embodiment of the present invention.

FIG. 3 illustrates a diagram 300 of an e-learning system displaying educational courses according to an embodiment of the present invention. As illustrated a user, once logged in to the LMS 210, is provided an option to select an educational course 212. In an exemplary embodiment, four titles shown are the "courses" being offered to the user/client. According to an embodiment, each course can comprise structured information related to one or more knowledge domains/modules/topics. Throughout this disclosure, knowledge domains, modules, topics have been used interchangeably. A module can have at least one lesson content; the lesson content including at least one category and related of the subject matter of the module/knowledge domain. The course materials modules are created by domain experts and can comprise information that structures the course material into one or more targeted lessons to address a specific section of a knowledge domain. Each lesson can further comprise information related to one or more categories, as discussed further herein.

FIG. 4 illustrates a diagram 400 describing knowledge domains/modules associated with an educational course according to an embodiment of the present invention. In one embodiment, system 100 offers the user to select an educational course 212, as illustrated by 401. There after, a user selects an educational course one or more topics/knowledge domains 214 are displayed. In one embodiment, the titles displayed on user interface 102 are the topics covered in a specific educational course. As illustrated, in one embodiment, when the user selects 'Educational Course 1', four knowledge domains (topics) 214 can be displayed to the user. Once the user selects a knowledge domain 214 system 100 using the techniques described herein selects lessons/training materials related to the knowledge domain and displays the material to the user.

FIG. 5 illustrates diagram 500 of an educational course material associated with one or more categories of subject matter of according to an embodiment of the present invention. In one embodiment, the training material associated with a given topic is displayed, as indicated by label 502. For a given topic/knowledge domain 214, a series of lessons/training material 504 are displayed. Each lesson content 216 includes at least one category and associated subject matter details, and can include one or more pages of expository textual, graphic, or video materials explaining the subject matter associated with at least one knowledge domain being studied. Associated with each topic/module, system 100 maintains a set of competency values in database 106. These competency values form the data of metrics 106C. In one embodiment, after viewing/studying the expository material, the student/user/client can be presented with a series of questions relating to the subject matter associated with the selected topic(s) or knowledge domain(s). In another embodiment, each lesson can be internally identified to cover one or more categories associated with the knowledge domain.

Comprehension Metrics

In one embodiment, determining the flow of the training material, using a heuristic approach, is based on a number of static data in an attempt to determine appropriate next steps that are needed to analyze the behavior of the user. Associated with each page of information, lesson content 216, system 100 maintains a set of competency values that are used by A/D subsystem 110 in determining user comprehension of the associated subject matter.

A module 214, can have category of information, e.g. Legal, Financial, Regulatory, etc., associated with each lesson content 216. The system maintains a computed value for each category as further discussed herein. During the display and reading phase of the process, user feedback response tracking subsystem 108 tracks the time taken by the trainee moving through the information in that module. In one embodiment, Time Allowed 234, 236, or 238 are countdown timers, and if a user does not complete the course within the specified time, A/D subsystem 110, suggests remedial actions, as discussed herein. Based on empirical data derived from live seminars given for the same material, system 100 is provided with the average time a student takes to comprehend the data. In one embodiment threshold values (e.g., 227, 229, 231, etc.) can be predetermined by the course creator and can be calculated by:

$$T(d) = T_d(\text{avg})/D$$

where T(d) represents the threshold value 227, threshold value 229, threshold value 231, etc., for each course detail level (d). $T_d$ (avg) represents the average expected time for a user to complete the course with course detail level d, and D represents content difficulty level 225 (as set by the course creator). Time Allowed 234, Time Allowed 236, or Time Allowed 238, in one embodiment, are maximum time values beyond which the system will assume that the student is having difficulty with comprehension.

The user's comprehension value can then be tracked based on the time take by the user to comprehend the material presented to the user divided by the difficulty level of the material 225. Therefore, in one embodiment, a user's comprehension value of the subject matter, U(c), can be represented by:

$$U(c)=T_d(u)/D$$

where $T_d(u)$ represents the time take by the user to read the material provided, with course level d.

Time values, in one embodiment, can be computed based on the clock time that elapses between the display of material and the next user action indicating completion of that material (normally by selecting "next"). If a user's comprehension value surpasses a threshold value (e.g., 227), or a time allowed counter (e.g., Time Allowed 234) expires, then A/D subsystem 110 can determine that the user can be having difficulty in comprehending the course material, and can instruct content display subsystem 104 to present remedial measures, that is, present the user with an option offering the next detailed level (e.g., detailed level (2) 222) that has been written to enhance the basic information presented in the lesson content. In one embodiment, if no response is received within a predetermined time period of offering the user remedial measures, A/D subsystem 110 assumes that the user has left the application unattended and is logged out of the system.

In one embodiment, lesson content 216 can be divided in multiple web-pages (or screens) and each page/screen can be assigned an independent allowed time (e.g., time allowed 234), and threshold score (e.g., 227). Thus, in such a case the user's comprehension value can be calculated as the cumulative score of the time taken by the user for all the pages/screens in lesson content 216 divided by difficulty of content 225. In such an embodiment, the user's subject matter comprehension value is calculated at the completion of lesson content 216, and can be described as:

$$U(c) = \frac{\sum_{1}^{p} T_d(u)}{D}$$

where $\sum_{1}^{p} T_d(u)$ represents the summation of the time taken by user u, to comprehend the material presented in p pages/screens for d level of lesson detail level, and D represents the content difficulty level.

In one embodiment, once the user's comprehension value exceeds the threshold value, the user is given the option to either take associated quiz 218, or receive supplemental information related to the topic at a greater level of detail (e.g., detail level (2) 222).

In one embodiment, the quiz can be initiated by the user by selecting the 'Take Quiz' button 506. By initiating the quiz when the user selects the 'Take Quiz' button 506, the user's response timing used to calculate metric(s) to determine the user's understanding of the subject matter associated with the selected topic(s) can be accurately recorded. A quiz can include at least one question related to at least one knowledge domain.

Figure 6:
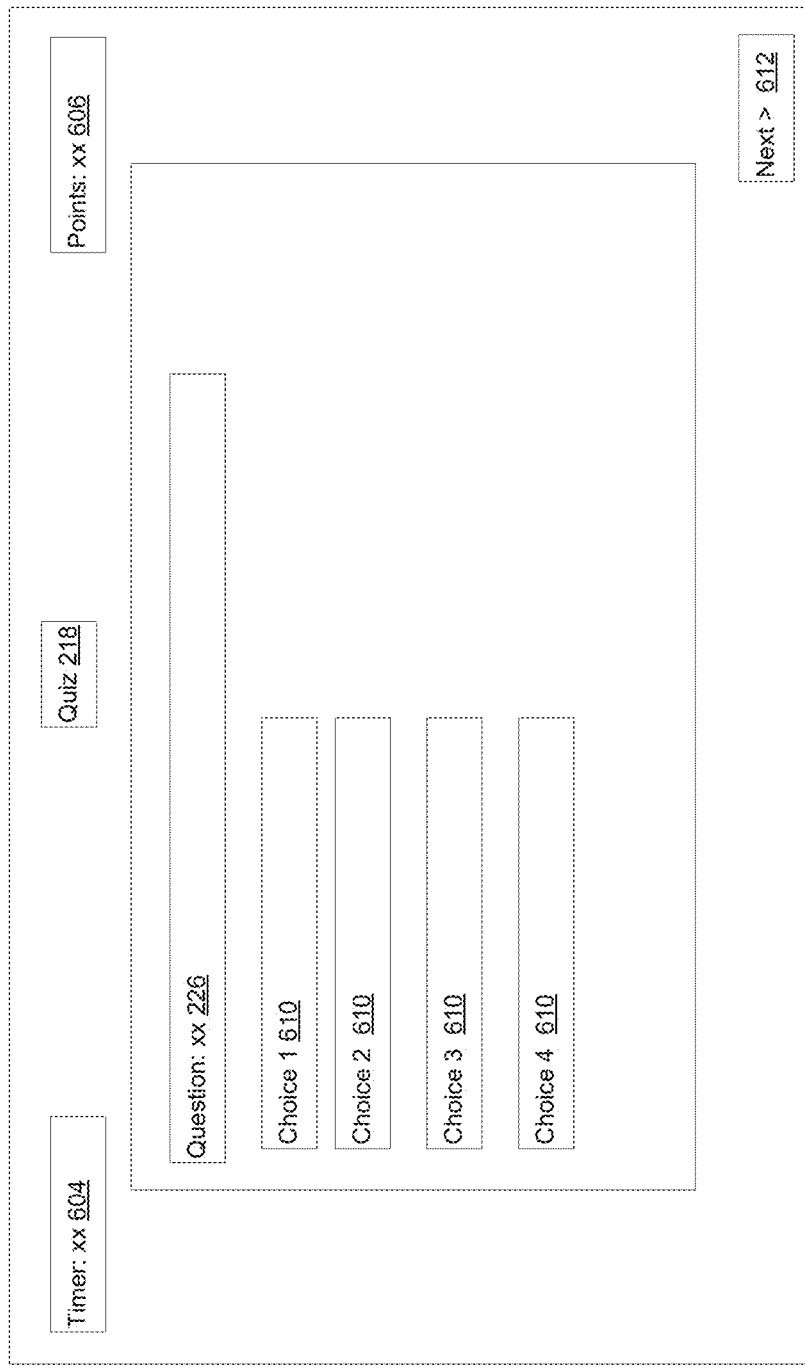
FIG. 6 illustrates a diagram of a quiz question associated with at least one category, according to an embodiment of the present invention.

FIG. 6 illustrates a diagram 600 of a quiz question associated with at least one category, according to an embodiment of the present invention. As illustrated, in one embodiment, a question is presented on an individual page/screen, with multiple choice answers to that question. In one embodiment, once the student/user/client elects to 'Take Quiz' 506 the question phase is entered. In another embodiment, once the user indicates their desire to take the quiz, timer 604 is initiated. Timer 604, in one embodiment, can calculate the time taken by the user in providing a response to a given question. The response time, among other factors, can be used to calculate metric(s) based on which the system can analyze student behavior and heuristically tailor individualized/personalized, one to one, training materials, as further described herein. In one embodiment, the training materials are heuristically customized for a user after the user gets the first set of questions incorrect.

In order to ensure that the response timings for each question that are used to calculate a given set of metric(s) are valid, entering the question area requires an overt act, specifically selecting the 'Take Quiz' 506 button, so that timer 604 does not start until the user is ready. In one embodiment, each question 226 of quiz 218 can also be internally identified with a category of knowledge that can be used while calculating the metric(s) for determining the topic area where individualized (or personalized) additional assistance may be required.

In one embodiment, the timer(s) associated with a question or quiz start once the full text of the possible answers is displayed so that no penalty is associated with network latency. Thereafter, the student selects one of the answers presented as choices 610. The user can see points 606 associated with the quiz to indicate the user's current score (reflecting on the user's passing or failing the quiz). In one embodiment, the system records for each action the number of milliseconds that elapsed, as well as whether the question was answered correctly. Each question category, in one embodiment, tracks a value for 'lack of understanding of category.' If an incorrect answer is selected a numerical value is added to the tracking value for the category. In a given knowledge domain, there can be at least one (preferably multiple) question-answer sets for each category (e.g., five or six questions relating to each category). Having multiple questions for a category ensures that the system accurately determines the user's understanding of the subject matter associated with at least one knowledge domain/topic. One the user clicks/taps next 612, the associated threshold values and user response time are considered to calculate the desired metrics, as further discussed herein.

In one embodiment, the answers, related timings, and other metrics (if any), are stored and maintained in a database. These values/metrics can be used to heuristically determine the level of detailed training material/lesson that needs to be generated for the user, for a given category where the system determines a lack of adequate understanding of the subject matter.

After each answer is provided by the user a result can be computed and the category values can be adjusted accordingly (depending on whether the user provided a correct or incorrect response, the time taken to provide the response, etc.). Thus, in such a manner, the system can determine whether for a given subject matter the student/user has passed (e.g., above the threshold if the tracking value is increasing, and below the threshold value if the tracking value is decreasing) indicating that the student/user is having difficulties understanding that concept.

Testing Metrics

In one embodiment, once a quiz is initiated (e.g., by clicking button 506), a user interface displays a set of questions to a user. In one embodiment, only one question is displayed per screen, and the next question is displayed after the user clicks or taps on the next button. A quiz can have a plurality of questions. In one embodiment, the questions are in a multiple-choice format where the correct answer is presented along with incorrect answers. For each question a count-down timer (T1) that starts at a number determined by the content creator in which it is presumed the question can be reasonably answered correctly. In one embodiment, this value is saved as Time Allowed 228. In addition, another timer, also set by the course creator, is associated with a question that represents the time it is determined for an average user to provide the correct answer (T2). In one embodiment, this value can be saved as question threshold 230. In one embodiment, each question set 218 can have a threshold difficulty value 233 represents a value, which when surpassed, indicates A/D subsystem 110 that the user may have difficulty with subject matter and may not succeed in the quiz. In one embodiment, threshold difficult value 233 is set by the course creator. A user's cumulative potential difficulty score 232 for question set 218 is a cumulative value indicating the user's overall performance in taking the quiz. In one embodiment, if a user exceeds the time specified by T2 in providing the correct answer (but before the expiration of countdown timer T1), the user's cumulative "possible difficulty" score 232 is incremented by the time differential, that is, $$=PD(u)+T(u)-T2$$

where PD(u) represents the last known potential difficulty score for the quiz set, T(u) represents the time taken by user to answer the question, and T2 is the time for an average user to provide the correct answer. If the user does not answer the question in the allocated time, then T(u)=T1, the value of the countdown timer. In one embodiment, any user related time value is computed based on the clock time that elapses between the display of material and the next user action indicating completion of that question or question set (normally by selecting "next").

If either the threshold is exceeded, or if a single question is answered incorrectly twice, then A/D subsystem 110 instructs Content Display Subsystem 104 to inform the user that they are having difficulty and are offered the option of continuing with the quiz, reviewing the material again, or being shown a detailed level of information about the material. In one embodiment, the number of questions in a question set can be limited to each category of each lesson content 216.

FIG. 7 illustrates a diagram 700 of a heuristically determined detailed training material associated with at least one category related to a quiz question, according to an embodiment of the present invention. As discussed above, once the user's tracking value reaches or advances the threshold value for a given category (or categories) then the system can, in one embodiment, leave the quiz area and take the user/student off the main path of the course to present the user with a much more detailed training material related to the category/categories. The detailed course material (e.g., detail level (2) 222) is based on the determination that the user lacks a through understating of the subject area associated with the category and display subject matter 704 to the user. The system can, in one embodiment, using the calculated timing responses, selected answer, and other metric(s), calculate a level of detailed training material that needs to be generated for the user. A level, in one embodiment, signifies how detailed a particular training material needs to be. For example, if the user lacks a few concepts for a given subject area, a lower level value can be assigned and less detailed training materials can be generated and displayed to the user. If however, a low level of understanding related to a particular category is determined, a much more detailed training material is generated and displayed to the user to study.

As contrasted with the base material (that was initially supplied), the (supplemental) customized material can include numerous examples followed immediately by short quizzes to enhance the likelihood of understanding the category by the user/student. At various times during the presentation of the supplemental material, if the short quiz responses are correct, the student is asked if he wishes to return to the main quiz (from where the quiz was initially terminated).

In another embodiment, the level of the detailed/supplemental training material displayed to the user is increased (thus, more detailed supplemental training material is dynamically displayed), if the user responds incorrectly to the short quiz questions.

Figure 8:
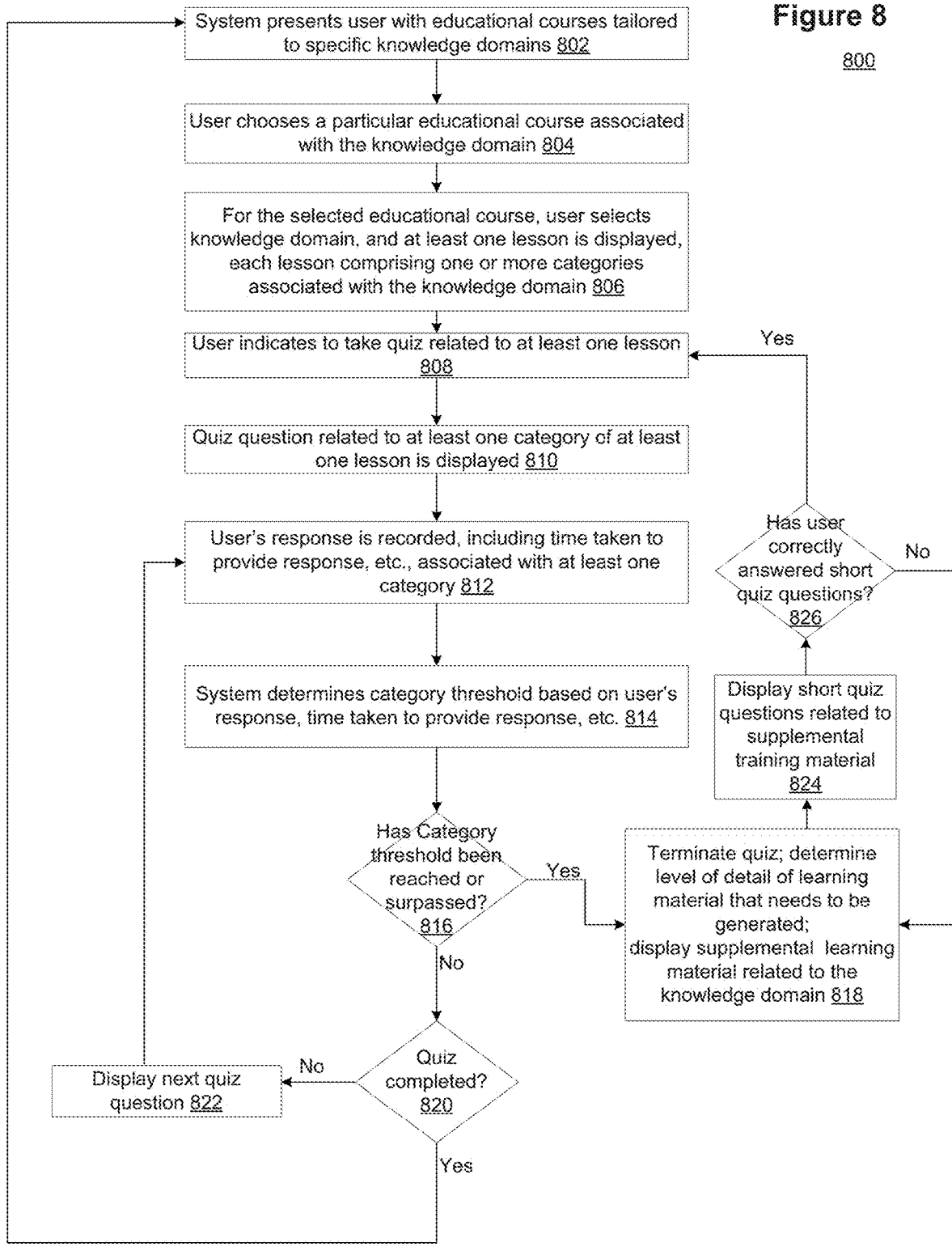
FIG. 8 illustrates a flowchart describing the process flow of a system that can heuristically analyze student behavior and tailor individualized training materials, to an embodiment of the present invention.

FIG. 8 illustrates a flowchart 800 describing the process flow of a system that can heuristically analyze student behavior and tailor individualized or personalized training materials, to an embodiment of the present invention. As illustrated, at 802, system presents user with educational courses tailored to specific knowledge domains. At 804, the User chooses a particular educational course associated with the knowledge domain. At 806, for the selected educational course, the user selects knowledge domain, and at least one lesson is displayed, each lesson comprising one or more categories associated with the knowledge domain. At 808, User indicates to take quiz related to at least one lesson. At 810, a quiz question related to at least one category of at least one lesson is displayed. At 812, the user's response is recorded in database 106 (by user feedback/response tracking subsystem 108), including time taken to provide response, etc., associated with at least one category, as discussed herein. At 814, system determines category threshold based on user's response from database 106 and time taken to provide response. At 816, it is determined whether a category threshold been reached or surpassed. If so, at 818, the quiz is terminated and a level of detailed learning course is determined and displayed to the user. In one embodiment, at 824, the user is display short quiz related to detailed level training material. At 826, if the user answers the questions correctly, control is passed on back to 808, where the user indicates their desire to take the main quiz. In one embodiment, the user continues the quiz from where it was initially terminated. If however, at 826, it is determined that the user has not answered the short quiz correctly, control is passed to 818, and more detailed course level is displayed to the user. If however, at 816, the threshold is not reached or surpassed, at 820, it is determined if the quiz has been completed. If so, control passes back to 802. However, in case the quiz is not completed, the system displays the next question, as discussed herein.

FIG. 9 illustrates a flowchart 900 describing the process flow of a server, according to an embodiment of the present invention. At 902, the user is presented with educational course(s) tailored to specific knowledge domains from which user can select at least one knowledge domain. At 904, based on user selection, at least one lesson is displayed, each lesson comprising subject matter related to one or more categories associated with the at least one knowledge domain. Responsive to user's instruction to display a quiz, at 906, the system provides at least one question related to the one or more categories At 908, user's answers that are incorrect for the question are determined. At 910, time taken by user to submit response to the question is determined. At 912, other metrics are determined (optional). At 914, a threshold value for a category associated with question is determined. At 916, once a threshold is reached/the system heuristically determines a level of detailed lessons to display to the user. At 918, the determined level of lessons is displayed to the user.

FIG. 10 illustrates a flowchart 1000 describing the process flow of a client machine, according to an embodiment of the present invention. At 1002, the user makes a selection to display educational course(s). At 1004, the educational course(s) is displayed. At 1006, the user indicates their desire to take quiz related to educational course(s); and a question is displayed. At 1008, a timer begins and user's existing score (if any) is displayed. At 1010, user selects answer. If the correct answer is selected, at 1012 it is determined if the quiz is complete, and if so, at 1014, the process is terminated. However, if it is determined, at 1012, that the quiz is not completed, at 1016, it is determined whether to display the next question or heuristically determine detailed course. If it is determined to display the next question, control is passed back to 1008, otherwise, in case of displaying a detailed course, at 1018, Short quiz related to detailed/supplemental course is presented to user. If user, at 1020, answers all short questions in the quiz correctly, control passes back to 1006. Otherwise, a higher level of detailed course is displayed to the user, at 1022, and thereafter control passes back to 1018.

FIG. 11 describes a block diagram 1100 illustrating an exemplary network environment as implemented according to an embodiment of the present invention. Network environment includes a network coupling one or more servers 1104 and one or more clients 1108 to each other via a network 1106. In particular embodiments, network is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks. This disclosure contemplates any suitable network. One or more links couple a server 1104 or a client 1108 to network 1106. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. This disclosure contemplates any suitable links coupling servers and clients to network.

In particular embodiments, each server 1104 may be a unitary server or may be a distributed server spanning multiple computers or multiple datacenters. Servers may be of various types, such as, for example and without limitation, web server, news server, mail server, message server, advertising server, file server, application server, exchange server, database server, or proxy server. In particular embodiments, each server 1104 may include hardware, software, or embedded logic components or a combination of two or more such components for carrying out the appropriate functionalities implemented or supported by server. For example, a web server is generally capable of hosting websites containing web pages or particular elements of web pages. More specifically, a web server may host HTML files or other file types, or may dynamically create or constitute files upon a request, and communicate them to clients in response to HTTP or other requests from clients. A mail server is generally capable of providing electronic mail services to various clients. A database server is generally capable of providing an interface for managing data stored in one or more data stores. In particular embodiments, a system using the techniques herein may be hosted on a server (e.g., as an LMS (e-learning) website belonging to MorfMedia, Inc.). Its users may access the e-learning system using their client devices (e.g. clients).

In particular embodiments, one or more data storages 1102 may be communicatively linked to one or more severs via one or more links. In particular embodiments, data storages 1102 may be used to store various types of information. In particular embodiments, the information stored in data storages 1102 may be organized according to specific data structures. In particular embodiments, each data storage 1102 may be a relational database. Particular embodiments may provide interfaces that enable servers or clients to manage, e.g., retrieve, modify, add, or delete, the information stored in data storage.

In particular embodiments, each client 1108 may be an electronic device including hardware, software, or embedded logic components or a combination of two or more such components and capable of carrying out the appropriate functionalities implemented or supported by client. For example and without limitation, a client 1108 may be a desktop computer system, a notebook computer system, a netbook computer system, a handheld electronic device, or a mobile telephone. This disclosure contemplates any suitable clients. A client may enable a network user at client to access network. A client 1108 may enable its user to communicate with other users at other clients.

A client may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user or client may enter a Uniform Resource Locator (URL) or other address directing the web browser to a server, and the web browser may generate a Hyper Text Transfer Protocol (HTTP) request and communicate the HTTP request to server. Server may accept the HTTP request and communicate to client one or more Hyper Text Markup Language (HTML) files responsive to the HTTP request. Client 1108 may render a web page based on the HTML files from server for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The techniques shown in the figures can be implemented using computer program instructions (computer code) and data stored and executed on one or more electronic systems (e.g., computer systems, etc.). Such electronic systems store and communicate (internally and/or with other electronic systems over a network) code and data using machine-readable media, such as machine-readable non-transitory storage media (e.g., magnetic disks; optical disks; random access memory; dynamic random access memory; read only memory; flash memory devices; phase-change memory). In addition, such electronic systems typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

It should be apparent from this description that aspects of the present invention may be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

Figure 12:
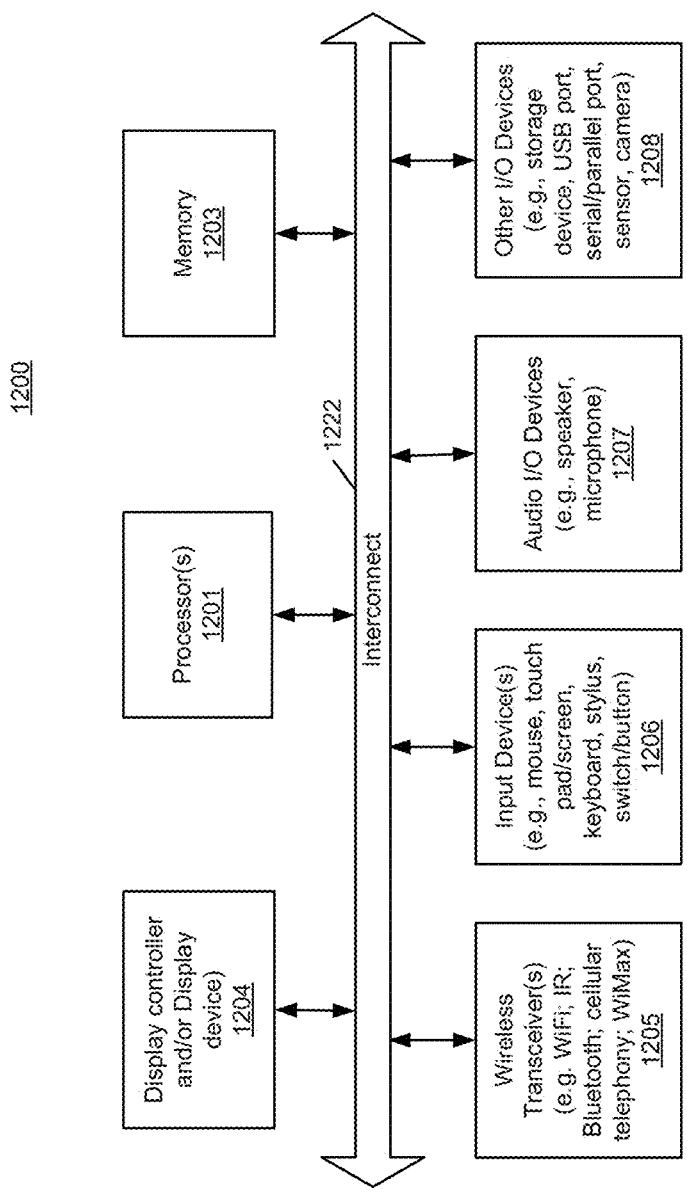
FIG. 12 describes a block diagram illustrating a data processing system such as a computing system which may be used with one embodiment of the invention.

FIG. 12 is a block diagram 1200 illustrating a data processing system such as a computing system which may be used with one embodiment of the invention. For example, computing system may be implemented as part of a LMS. In one embodiment, computing system may represent the server in the LMS/e-learning system. Computing system may have a distributed architecture having dispersed units coupled through a network, or all of its components may be integrated into a single unit. Computing system may be implemented as part of a diverse range of products implemented by MorfMedia, Inc.

For example, computing system 1200 may represent any of data processing systems described above performing any of the processes or methods described above. System 1200 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1200 is intended to show a high level view of many components of the computer system. However, it is to be understood that additional or fewer components may be present in certain implementations and furthermore, different arrangement of the components shown may occur in other implementations. System 1200 may represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 1200 includes processor 1201, memory 1203, and devices 1205-1208 via a bus or an interconnect 1222. Processor 1201 may represent a single processor or multiple processors with a single processor core or multiple processor cores included therein. Processor 1201 may represent one or more general-purpose processors such as a microprocessor, a central processing unit (CPU), or the like. More particularly, processor 1201 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1201 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1201, which may be a low power multi-core processor socket such as an ultra low voltage processor, may act as a main processing unit and central hub for communication with the various components of the system. Such processor can be implemented as a system on chip (SoC). In one embodiment, processor 1201 may be an Intel® Architecture Core™-based processor such as an i3, i5, i10 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments.

Processor 1201 is configured to execute instructions for performing the operations and methods discussed herein. System 1200 further includes a graphics interface that communicates with graphics subsystem 1204, which may include a display controller and/or a display device.

Processor 1201 may communicate with memory 1203, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 2010-2E (published April 2010), or a next generation LPDDR standard to be referred to as LPDDR3 that will offer extensions to LPDDR2 to increase bandwidth. As examples, 2/4/16 gigabytes (GB) of system memory may be present and can be coupled to processor 1210 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 1203 can be a machine readable non-transitory storage medium such as one or more volatile storage (or memory) devices such as random-access memory (RAM), dynamic RAM (DRAM), synchronous DRAM (SDRAM), static RAM (SRAM), or other types of storage devices such as hard drives and flash memory. Memory 1203 may store information including sequences of executable program instructions that are executed by processor 1201, or any other device. For example, executable code and/or data of a variety of operating systems, device drivers, firmware (e.g., input output basic system or BIOS), and/or applications can be loaded in memory 1203 and executed by processor 1201. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1200 may further include IO devices such as devices 1205-1208, including wireless transceiver(s) 1205, input device(s) 1206, audio IO device(s) 1207, and other IO devices 1208. Wireless transceiver 1205 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof.

Input device(s) 1206 may include a mouse, a touch-pad, a touch-sensitive screen (which may be integrated with display device 1204), a pointer device such as a stylus, and/or a keyboard (e.g., physical keyboard or a virtual keyboard displayed as part of a touch-sensitive screen). For example, input device 1206 may include a touch-screen controller coupled to a touch-screen. The touch-screen and touch-screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch-screen.

Audio IO device 1207 may include a speaker and/or a microphone to facilitate voice-enabled functions, such as voice-recognition, voice-replication, digital recording, and/or telephony functions. Other optional devices 1208 may include a storage device (e.g., a hard drive, a flash-memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1208 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1222 via a sensor hub (not shown), while other devices such as a keyboard or thermal sensor may be controlled by an embedded controller (not shown), dependent upon the specific configuration or design of system 1200.

To provide for persistent storage of information such as data, applications, one or more operating systems and so forth, a mass storage (not shown) may also couple to processor 1201. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1201, e.g., via a serial peripheral interface (SPI). This flash device may provide for non-volatile storage of system software, including basic input/output software (BIOS) as well as other firmware of the system.

Note that while system 1200 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium are described to implement a dynamically customized three dimensional geospatial visualization system. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A method implementing a learning management system to heuristically analyze behavior of a user and customizing individualized training materials comprising:
 displaying, on an interface, a first subset of educational material comprised in a set of educational material;
 receiving, from the user via the interface, a user action indicating completion of the first subset of educational material;
 determining a first clock time that elapsed between displaying the first subset of educational material and receiving the user action indicating completion of the first subset of educational material;
 determining a tracked value for the set of educational material, as a function of (a) a sum of the first clock time and one or more prior clock times, associated with the user and one or more subsets of educational material comprising the set of educational material, and (b) a factor representing a difficulty of the set of educational material;
 based on the tracked value, displaying one of: detailed information associated with the first subset of educational material or a second subset of educational material comprised in the set of educational material;
 wherein the detailed information associated with the first subset of educational material is displayed responsive to determining that the tracked value meets or exceeds a threshold value;
 wherein the second subset of educational material is displayed responsive to determining that the tracked value does not meet or exceed the threshold value;
 wherein the first clock time is determined based on displaying a first page of first information, and the one or more prior clock times are respectively determined based on displaying one or more second pages of second information;
 wherein the tracked value comprises a first value, divided by the factor representing the difficulty of the set of educational material; and
 wherein the first value comprises one of a sum of the first clock time and the one or more prior clock times and an average expected clock time for a user to complete the first set of educational material.

2. The method of claim 1, wherein the tracked value comprises the sum of the first clock time and the one or more prior clock times, divided by the factor representing the difficulty of the set of educational material.

3. The method of claim 1, wherein the threshold value comprises the average expected clock time for the user to complete the first set of educational material, divided by the factor representing the difficulty of the set of educational material.

4. The method of claim 1, wherein the set of educational material is a quiz, and the first and second subsets of educational material are questions.

5. The method of claim 1, wherein:
the first subset of educational material is a quiz;
the detailed information associated with the first subset of educational material is a detailed lesson related to the quiz; and
further comprising:
  upon determining that the tracked value meets or exceeds the threshold value, ceasing to display the quiz;
  updating the tracked value, based on a clock time associated with the detailed information associated with the quiz; and
  based on the updated tracked value, either: displaying additional detailed information related to the quiz or resuming display of the quiz.

6. The method of claim 1, wherein the set of educational material is a lesson, and the first and second subsets of educational material are parts of the lesson comprising structured information.

7. The method of claim 1, wherein the detailed information associated with the first set of educational material comprises suggested remedial actions for the user.

8. A learning management system to heuristically analyze behavior of a user and customizing individualized training materials comprising at least one hardware processor configured to:
display, on an interface, a first subset of educational material comprised in a set of educational material
receive, from the user via the interface, a user action indicating completion of the first subset of educational material;
determine a first clock time that elapsed between displaying the first subset of educational material and receiving the user action indicating completion of the first subset of educational material;
determine a tracked value for the set of educational material, as a function of (a) a sum of the first clock time and one or more prior clock times, associated with the user and one or more subsets of educational material comprising the set of educational material, and (b) a factor representing a difficulty of the set of educational material;
based on the tracked value, display one of: detailed information associated with the first subset of educational material or a second subset of educational material comprised in the set of educational material;
wherein the detailed information associated with the first subset of educational material is displayed responsive to determining that the tracked value meets or exceeds a threshold value;
wherein the second subset of educational material is displayed responsive to determining that the tracked value does not meet or exceed the threshold value;
wherein the first clock time is determined based on displaying a first page of first information, and the one or more prior clock times are respectively determined based on displaying one or more second pages of second information;
wherein the tracked value comprises a first value, divided by the factor representing the difficulty of the set of educational material; and
wherein the first value comprises one of a sum of the first clock time and the one or more prior clock times and an average expected clock time for a user to complete the first set of educational material.

9. The system of claim 8, wherein the tracked value comprises the sum of the first clock time and the one or more prior clock times, divided by the factor representing the difficulty of the set of educational material.

10. The system of claim 8, wherein the threshold value comprises the average expected clock time for the user to complete the first set of educational material, divided by the factor representing the difficulty of the set of educational material.

11. The system of claim 8, wherein the set of educational material is a quiz, and the first and second subsets of educational material are questions.

12. The system of claim 8, wherein:
the first subset of educational material is a quiz;
the detailed information associated with the first subset of educational material is a detailed lesson related to the quiz; and
further configured to:
  upon determining that the tracked value meets or exceeds the threshold value, cease to display the quiz;
  update the tracked value, based on a clock time associated with the detailed information associated with the quiz; and
  based on the updated tracked value, either: display additional detailed information related to the quiz or resume display of the quiz.

13. The system of claim 8, wherein the set of educational material is a lesson, and the first and second subsets of educational material are parts of the lesson comprising structured information.

14. The system of claim 8, the detailed information associated with the first set of educational material comprises suggested remedial actions for the user.

15. A non-transitory computer readable medium comprising instructions which when executed by a processor system implements a method to heuristically analyze behavior of a user and customizing individualized training materials by a learning management system, the method comprising:
displaying, on an interface, a first subset of educational material comprised in a set of educational material;
receiving, from the user via the interface, a user action indicating completion of the first subset of educational material;
determining a first clock time that elapsed between displaying the first subset of educational material and receiving the user action indicating completion of the first subset of educational material;
determining a tracked value for the set of educational material, as a function of (a) a sum of the first clock time and one or more prior clock times, associated with the user, and one or more subsets of educational material comprising the set of educational material, and (b) a factor representing a difficulty of the set of educational material;
based on the tracked value, displaying one of: detailed information associated with the first subset of educational material or a second subset of educational material comprised in the set of educational material;

wherein the detailed information associated with the first subset of educational material is displayed responsive to determining that the tracked value meets or exceeds a threshold value;

wherein the second subset of educational material is displayed responsive to determining that the tracked value does not meet or exceed the threshold value;

wherein the first clock time is determined based on displaying a first page of first information, and the one or more prior clock times are respectively determined based on displaying one or more second pages of second information;

wherein the tracked value comprises a first value, divided by the factor representing the difficulty of the set of educational material; and wherein the first value comprises one of a sum of the first clock time and the one or more prior clock times and an average expected clock time for a user to complete the first set of educational material.

16. The non-transitory computer readable medium of claim 15, wherein the tracked value comprises the sum of the first clock time and the one or more prior clock times, divided by the factor representing the difficulty of the set of educational material.

17. The non-transitory computer readable medium of claim 15, wherein the threshold value comprises the average expected clock time for the user to complete the first set of educational material, divided by the factor representing the difficulty of the set of educational material.

18. The non-transitory computer readable medium of claim 15, wherein the set of educational material is a quiz and the first and second subsets of educational material are questions.

19. The non-transitory computer readable medium of claim 15, wherein:
the first subset of educational material is a quiz;
the detailed information associated with the first subset of educational material is a detailed lesson related to the quiz; and
further comprising:
upon determining that the tracked value meets or exceeds the threshold value, ceasing to display the quiz;
updating the tracked value, based on a clock time associated with the detailed information associated with the quiz; and
based on the updated tracked value, either: displaying additional detailed information related to the quiz or resuming display of the quiz.

20. The non-transitory computer readable medium of claim 15, wherein the set of educational material is a lesson, and the first and second subsets of educational material are parts of the lesson comprising structured information.

* * * * *